United States Patent
Trivedi

[15] 3,666,686
[45] May 30, 1972

[54] PRODUCTION OF STABILIZED ALUMINUM BROMIDE SOLUTIONS

[72] Inventor: Pankajkumar Mahasukhrai Trivedi, St. Louis, Mich.

[73] Assignee: Michigan Chemical Corporation, St. Louis, Mich.

[22] Filed: May 7, 1969

[21] Appl. No.: 822,710

[52] U.S. Cl. .................................. 252/429, 23/93, 252/442
[51] Int. Cl. .......................................... B01j 11/78
[58] Field of Search ...................................... 252/429; 23/93

[56] References Cited

UNITED STATES PATENTS 2,439,737  4/1948  Houston et al. .............................. 23/93
3,000,992  9/1961  Glaser et al. .............................. 23/93 X Primary Examiner—Patrick P. Garvin
Attorney—D. Cameron Pond

[57] ABSTRACT

Stabilized solutions of aluminum bromide in cyclohexane are produced by adding 0.5 – percent by volume of benzene or 0.5 – 2 percent by weight of triphenol [1,1,3(3-hydroxyphenyl) propane]. The rapid degradation of unstabilized solutions at room temperature is markedly retarded for a period of at least 30 days so that the solutions may be shipped and stored and used instead of solid aluminum bromide as a Lewis acid type catalyst.

3 Claims, No Drawings

PRODUCTION OF STABILIZED ALUMINUM BROMIDE SOLUTIONS

The present invention relates to a method for providing stabilized aluminum bromide solutions having an extended shelf life without appreciable loss of aluminum bromide values, and to the stabilized solutions produced thereby.

Aluminum bromide ($AlBr_3$) is widely used in many chemical processes, especially as a Lewis acid type catalyst in the petroleum industry. For example, it may be used in a reforming procedure whereby a mixture of various hydrocarbons mostly straight chained in character may be subjected to a relatively simple pyrolytic treatment in the presence of aluminum bromide to produce a substantial increase in the branch chained hydrocarbons and thereby provide compositions of greater activity and thus of increased value. Also, an aluminum bromide catalyst may be used in the polymerization of gaseous hydrocarbons to produce liquid materials which are practically always more desirable since they find more widespread use.

But, if this versatile catalyst is to be useful in the petroleum industry as well as in other industries, it must be available in a convenient, easy to handle form and produce reasonably uniform and reproducable results. Solid aluminum bromide causes many difficulties along these lines. For instance, its surface area leaves something to be desired. Usually it is not sufficiently homogeneous to produce the necessary uniform results, and there is considerable difficulty in handling it especially in the presence of moisture. Even traces of water affect it appreciably and processes which must be operated under anhydrous conditions are, of course, expensive, difficult to run, and often impracticable commercially.

In order to overcome some of the difficulties inherent in the use of aluminum bromide as a catalyst in the solid form, it has been suggested that it should be dissolved in a suitable solvent; and supplied and used in solution, preferably in an organic solvent capable of being utilized in the processes for which the aluminum bromide is used as the catalyst. It would seem at first that this would provide a simple solution to the difficulties of handling and using aluminum bromide. For instance, Seidell's "Solubility of Inorganic and Metal Organic Compounds" (4th edition) provides solubility data of aluminum bromide in some 26 organic solvents. From this data it would appear that all one had to do was to select a suitable solvent and dissolve the aluminum bromide in it, providing a solution having from 25 to 40 percent by weight of aluminum bromide available for use in the petroleum cracking, reforming or other processes for which it operates as a catalyst.

Benzene, toluene, carbondisulfide, normal hexane and cyclohexane, among others, were tried with the intention of producing such a solution. Many difficulties were encountered however. In the first place, aluminum bromide is very reactive with these and other organic solvents. Cyclohexane, for instance, undergoes an isomerization reaction which results in the deterioration of the aluminum bromide values of a cyclohexane solution containing aluminum bromide. At room temperature complete degradation takes place rather rapidly after the formation of the solution, not only as a result of this isomerization but also as a result of autodestructive alkylation and the formation of olefins. Apparently, the olefins polymerize so that the aluminum bromide either dissolves in the polymers or forms complexes with them, or with the olefins, or possibly with the various products resulting from other side reactions. Aluminum bromide is known to form such complexes readily. Since these complexes and the polymers themselves are almost always insoluble in a solvent such as cyclohexane, an oily layer separates out often accompanied by tarry products as well. For whatever the reason, the overall result is that the aluminum bromide values in the cyclohexane phase deteriorate markedly.

Also, the low rate of solution of solid aluminum bromide in the solvent together with the inevitable presence of moisture, hydrogen bromide or bromine not only reduce the aluminum bromide value in the solution, but produce a wholly unsatisfactory solution for its intended purpose. In fact, it was found necessary to attempt to exclude moisture from the solvent during the dissolving process and to conduct the operation at about 0°C. if a solution which was at all satisfactory were to be obtained; and unless the solution were to deteriorate very rapidly, it was necessary to store it at 0°C. or thereabouts. In spite of such precautions, the solutions were often dark colored, and the side reactions continued so that additional amounts of the tarry precipitates or the oily layer continued to form.

Some of these difficulties may be overcome by adding the aluminum bromide to the solvent such as cyclohexane in the molten state instead of the solid state, and at ambient temperatures and pressures. Aluminum bromide is easy to melt and to handle at ordinary temperatures since its melting point is approximately 97°C. and it may be handled quite easily at 110°C. or thereabouts. The molten aluminum bromide can be poured into a container containing the solvent. As the molten aluminum bromide comes into contact with the solvent, fumes are formed containing some vaporized solvent, moisture and some hydrogen bromide. It is therefore preferable that the aluminum bromide be melted under a current of dry nitrogen gas or a similar dry protective layer thus minimizing contact between the molten aluminum bromide and the moisture which is present in the surrounding atmosphere. Also, the solvent should be agitated during the dissolving procedure. If these precautions are observed, the aluminum bromide may be readily dissolved in the solvent without difficulty and without any hazardous conditions to the handlers. But such solutions of aluminum bromide are not stable and rapidly deteriorate extensively, whether or not they are prepared by this more convenient procedure.

Accordingly, unless the solution is freshly prepared prior to use, it cannot be used for its intended purpose as a catalyst. It would, of course, be much more desirable to ship the solution to the point of use and to store it there until it is needed. Furthermore, various conditions which are often encountered increase the rate of the deterioration materially. It occurs more rapidly in the presence of light, as the temperature is increased as noted above, and if the initial concentration of aluminum bromide is higher in the solution. Furthermore, the deterioration takes place no matter what precautions were taken to form the solution initially; that is, molten aluminum bromide may be used, or care may be taken to provide a protective blanket during the solution. But nevertheless, the solution is unstable thereafter. About the only way of keeping the solution from deteriorating completely and very rapidly was to store it in the cold and to prepare it in the cold as well; that is, at a temperature of about 0°C. However, it is evident that such conditions are impracticable if not impossible to maintain during ordinary shipping, storage and use so that the solution in effect is not available as a catalyst, although aluminum bromide itself has many advantages.

According to the present invention, it has been discovered that solutions of aluminum bromide in cyclohexane may be stabilized for an appreciable time enabling them to be prepared, shipped and stored as a practical matter. These solutions may be stabilized and the rate of deterioration considerably retarded by the addition of certain retarding agents; in particular, benzene or tri(hydroxyphenyl) propane which may be represented by the structural formula: $(C_6H_4OH)_2$-$CH$-$CH_2$-$CH_2$-$C_6H_4OH$. Inasmuch as aluminum bromide would be expected to be reactive with these additives as well as with the cyclohexane, it is surprising that they produce the desired retarding effect.

The following examples are presented by way of further illustration of the invention, but should not be construed as limiting. All parts and percentages, including those in the examples, are by weight unless otherwise indicated. These examples were prepared so as to provide approximately 100 ml. of solution and with the exception of Examples 5 and 6, an aluminum bromide concentration of about 20 percent. In Examples 5 and 6, the concentration was deliberately kept lower. In order to provide these examples, the following procedure was utilized. In a three neck flask equipped with suitable sealed joints, a weighed amount of aluminum bromide was placed in the form of a solid material broken up into small pieces. Dry nitrogen gas was swept thru the flask. A glass stirrer was provided and the flask was heated so as to melt the aluminum bromide. In another four neck flask, the calculated amount of cyclohexane was placed. A glass stirrer was provided in one opening extending into the solvent and a suitable condenser was connected to the other opening. Through a third opening, a thermometer was placed dipping into the solvent. The molten aluminum bromide from the first flask was slowly poured into the second flask with the stirrer in operation keeping the cyclohexane well agitated.

In two such experiments, the cyclohexane was kept at almost freezing temperatures (5°C.), and molten aluminum bromide was added under these conditions. In a third experiment, the cyclohexane was kept at room temperature but no retardant was added. In the fourth example, the cyclohexane was kept at room temperature but contained as an additive one percent by volume of benzene. In the fifth and sixth examples, there was added respectively one percent by volume of benzene and ½ percent by weight of tri(hydroxyphenyl) propane. The aluminum bromide values after certain periods of time were determined and are set forth in Table I:

TABLE I

| Example | Conc. Aluminum Bromide | % of Aluminum Br. after 8 days | after 16 days | after 30 days | Comments |
|---|---|---|---|---|---|
| 1 | 21.83 | 22.34 | 21.44 | 18.85 | Sample stored at 1-5° C. |
| 2 | 21.83 | 22.12 | 21.81 | 18.84 | Contained 1% benzene* and stored as in Example 1. |
| 3 | 21.83 | 13.85 | 3.60 | – | Stored at room temperature, no additive |
| 4 | 21.83 | 22.11 | 21.05 | 17.12 | Stored at room temperature 1% benzene* |
| 5 | 16.12 | – | 16.88 | 14.62 | Stored at room temperature 1% benzene* |
| 6 | 16.12 | – | 16.46 | 13.64 | Stored at room temperature, 0.5% tri(hydroxyphenyl) propane |

*1% by volume; that is, 1 ml. per 100 ml. cyclohexane
**0.5% by weight; that is, 0.5 grams per 100 ml. cyclohexane An analysis of the losses of aluminum bromide values particularly with regard to Example 3 indicates that the loss occurs quickly and at an increased rate with time unless the solution is kept refrigerated or is retarded. In fact, Example 3 showed approximately 36.7 percent loss during the first 8 day period, approximately 46.8 percent during the second 8 day period, and an overall loss of approximately 84 percent for the 30 day period. It will also be noted that at lower concentrations, even if the solution is retarded, it does not show as great a loss as a more concentrated solution at least at room temperatures. Example 4, for example, shows no appreciable loss after 16 days but shows a loss of approximately 20 percent after 30 days. Example 5, however, during a 30 day period showed a loss of only about 9 percent.

These results and others obtained from similar experiments have indicated an unsuspected phenomenon; namely, that the retarded solutions show little loss over relatively long periods of time; but show a rapid rate of loss once the loss starts. In fact, the retarded solution will very soon completely deteriorate once the deterioration sets in, and after a period of about 30 days has passed, it will reach a stage of degradation comparable to an untreated solution; but will show no detectable loss for at least 16 days and little loss for 30 days.

It should be especially noted that the additives of the present invention are retardants, not inhibitors. They do not completely prevent the side reactions from taking place; but slow them down appreciably in such a way as to provide a substantially unaffected solution for present purposes over a rather long period of time. The reason for these results are not understood completely; but some of the possible reactions, or paths for the reactions are indicated in the following equations which may offer a partial explanation.

In the first place, it is known that when aluminum bromide is mixed with cyclohexane, a part of the cyclohexane isomerizes to methylcyclopentane until equilibrium is reached; that is, the process is reversible. At about 25°C. equilibrium is reached at a methylcyclopentane concentration of 11 to 13 percent; and when plotted as a function of temperature such equilibrium percentages increase with the temperature apparently in a straight line relationship at least for aluminum chloride and presumably for aluminum bromide - see "Rate of Isomerization of Cyclohexane", A. P. Lien et al, Ind. Eng. Chem. 44, (1952) pages 351 to 353.

Aluminum has three vacancies in the electron shells of its structure, and bromine has one so that the compound aluminum bromide ($AlBr_3$) is very reactive and is especially responsive to proton donators. Cycloparaffins are known proton donators and therefore are very reactive with aluminum bromide. Aluminum bromide is also considerably more reactive in the presence of at least traces of water, HBr or bromine. It is known that when it is used as a Lewis acid type catalyst, such chain starters as water, HBr or bromine are needed; usually HBr. As a practical matter, when an aluminum bromide solution in cyclohexane or the like is formed, some moisture or water is present or will get to the solution after its formation. Also, at least some HBr is present due to the reactivity of aluminum bromide with the cycloparaffins. Thus, it is most difficult to provide a stable solution since elimination of the moisture or HBr or bromine is not only almost impossible; but the catalytic activity of the aluminum bromide would be greatly reduced if they were completely eliminated in order to stabilize the solution. Some of the reactions involving HBr, $Br_2$ and water are the following:

$R + Br_2 \rightarrow R \cdot Br + HBr$
$R + AlBr_3 \rightarrow R \cdot Br + [H^+ \cdot Al^-Br_2]$
$AlBr_3 + H_2O \rightarrow HOAlBr_2 + HBr$
$R \cdot Br + AlBr_3 \rightleftarrows [R^+AlBr_4^-]$
$R$ = hydrocarbon such as cyclohexane.

It is suggested that the principal side reactions follow the chemical paths represented by the equations set forth below, but it is certainly possible that the reaction could follow any one or all three of these paths, as well as other paths which are not represented by these equations.

I

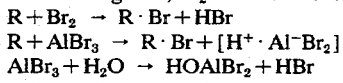
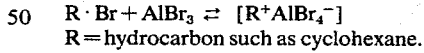
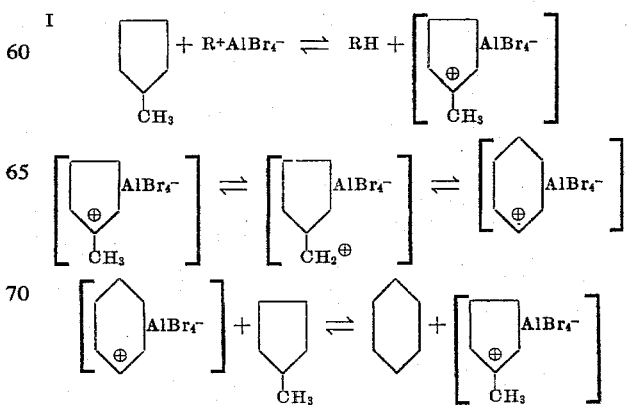

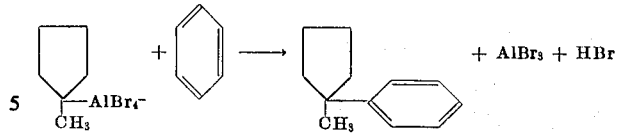

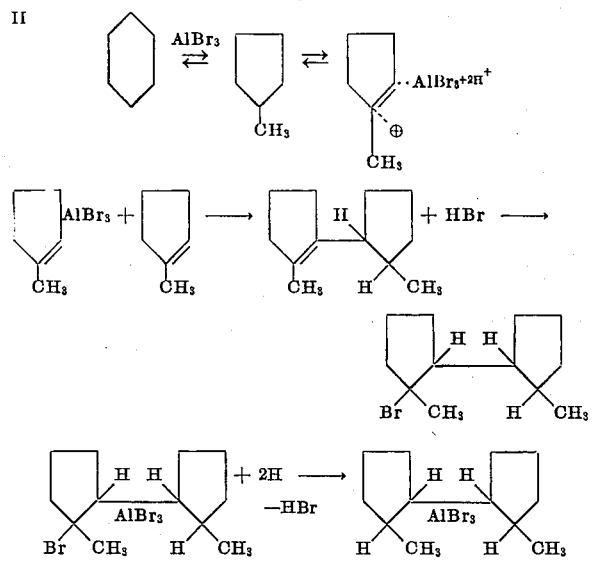

It is believed that the use of the retardants of the present invention particularly benzene, result in a chain breaking effect by reacting with the carbonium ion at ⊕ of reaction II. This results, it is suggested, in preventing this reaction from continuing so that the normal equilibrium reaction between cyclohexane and cyclomethylpentane remains stable at least for a relatively long period of time. The reaction between benzene and the carbonium ion it is suggested, could follow the following path.

Benzene as well as the other retardants are not inhibitors in the strict sense of that term. They seem to delay for an appreciable period of time, the build-up of the carbonium ion concentration. They do not prevent its formation. In fact, it would appear that some would have to form eventually. Also, the benzene may react with the carbonium ion in equation I, and thus have a tendency to prevent the formation of cyclohexane from methylcyclopentane. It is believed that this would only affect the equilibrium point between cyclohexane and methylcyclopentane and possible cause it to differ from that suggested in the literature. But this effect does not cause degradation of the solution of aluminum bromide in cyclopentane, for purposes of the present invention.

In view of the complicated side reactions and chemical mechanism, some of which has been discussed above, it is considered surprising that benzene or tri(hydroxyphenyl) propane when used in the amounts recommended in accordance with the present invention, would produce the extensive retardation of the side reactions. In this connection, it should be pointed out that various other hydrocarbons were tried as retardants. Xylene and toluene, for instance, did not produce satisfactory results for present purposes. Also, various other hydrocarbons which were thought to be promising failed to produce satisfactory results. They included quinones, acetylchloride and nitromethane.

The amount of retardant which is used may well have a noticeable affect on the life of the aluminum bromide as a catalyst. In fact, when benzene is used as the retardant, it should be used in amounts of 0.5 to 1 percent by volume and if tri(hydroxyphenyl) propane is used, it should be used in the amounts of 0.5 to 1 percent by weight to produce the desired results. The use of appreciably larger quantities, more than 2 percent by volume, for instance, of benzene will result in the formation of enough alkylated benzene to result in a loss in activity of the aluminum bromide solution as a catalyst. Similar results apparently occur for tri(hydroxyphenyl propane as well. Thus, the amount of the benzene or tri(hydroxyphenyl) propane should be at least 0.5 percent and not more than 2 percent, (by volume, and by weight respectively) and preferably 0.5 - 1 percent.

What is claimed is:

1. A solution of aluminum bromide in cyclohexane characterized by a relatively long shelf-life and containing as a stabilizer about 0.5 – 2 percent by volume of benzene, or about 0.5 – 2 percent by weight of tri(hydroxyphenyl) propane.

2. A solution according to claim 1 in which the stabilizer consists essentially of 0.5 – 1 percent by volume of benzene.

3. A solution according to claim 1 in which the stabilizer consists essentially of 0.5 – 1 percent by weight of tri(hydroxyphenyl) propane.

* * * * *